US000002040H

(19) United States

(12) Statutory Invention Registration (10) Reg. No.: US H2040 H

Reiser (43) Published: Aug. 6, 2002

(54) PERSONAL COMPUTER BASED UTILITY PROGRAM FOR AN ELECTRONIC COUNTERMEASURE SYSTEM

(75) Inventor: Joseph L. Reiser, Camarillo, CA (US)

(73) Assignee: The United States of America as represented by the Secretary of the Navy, Washington, DC (US)

(21) Appl. No.: 09/084,050

(22) Filed: May 22, 1998

(51) Int. Cl.[7] ..... G06F 13/10

(52) U.S. Cl. ..... 395/500.42

(58) Field of Search ..... 395/500.42, 500.34

(56) References Cited

U.S. PATENT DOCUMENTS 5,390,356 A * 2/1995 Houlberg ..... 395/500.44

* cited by examiner

*Primary Examiner*—Daniel T. Pihulic

(74) *Attorney, Agent, or Firm*—David S. Kalmbaugh

(57) ABSTRACT

A utility software program which provides Operational Flight Program and User Data File software files for an AN/ALQ-165 Deceptive Electronic Countermeasures set in a Personal Computer DOS compatible format. The software program is a personal computer based software utility program that emulates a VAX computer based loader program. The software program reads Operational Flight Program and User Data File ATAC Bootstrap Loader format files from personal computer disk files. The software program writes ATAC Download Record format binary files to a personal computer disk. The output file format provided by the software program of the present invention comprises one contiguous block of data having one or more data records, one BIT table and one End-of-File record.

6 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PERSONAL COMPUTER BASED UTILITY PROGRAM FOR AN ELECTRONIC COUNTERMEASURE SYSTEM

BACKGROUND OF THE INVENTION

1. Field of the Invention

This invention relates generally to a utility software program adapted for use with an electronic countermeasures system. In particular, the present invention relates to an IBM compatible utility software program which is adapted to format the Operational Flight Program and the User Data File software for the AN/ALQ-165 Deceptive Electronic Countermeasures set, which is also referred to as the Airborne Self Protection Jammer (ASPJ) used on the F/A-18 Aircraft.

2. Description of the Prior Art

Currently the Operational Flight Program and the User Data File software for the AN/ALQ-165 Deceptive Electronic Countermeasures set is generated using software tools hosted on a Digital Equipment Corporation VAX 3500 computer. The VAX 3500 computer is connected via an IEEE-488 bus to an interface board in an Applied Technology's Advanced Computer (ATAC) Support Equipment system. The Advanced Computer Support Equipment System communicates via an RS-422 serial interface with a multiplexer circuit inside the main computer (referred to as the Weapons Replaceable Assembly 3 or WRA-3) of the AN/ALQ-165. The multiplexer circuit, in turn, can communicate with either of two central processing units referred to as processing elements 1 and 2 which reside within the main computer of the AN/ALQ-165.

A VAX computer software utility, referred to as the ATAC Monitor program, is used to load Operational Flight Program and User Data File data into RAM memory in processing element 1 or processing element 2 address space. An ATAC executable program, referred to as the "Loader" is then loaded into AN/ALQ-165 memory. When executed, the "Loader" reads command block data from a designated area in RAM which defines the addresses and sizes of RAM segments to program into the EEPROM non-volatile memory of the main computer of the AN/ALQ-165. The "Loader" converts the input data in ram to an ATAC download record format before writing the data to the EEPROM non-volatile memory of the main computer of the AN/ALQ-165.

When all AN/ALQ-65 software modules have been programmed and verified by the "Loader" program the WRA-3 computer may be used as a software master program to generate memory loader tapes. An AN/ASM-687 Advanced Memory Loader/Verifier is a test set used to generate tape transport cartridges for the F/A-18 aircraft.

To generate a tape transport cartridge the AN/ASM-687 Advanced Memory Loader/Verifier is coupled to the Military Standard 1553 multiplex data bus from an Airborne Self Protection Jammer is a spread bench and performs a file Save operation by enabling certain discrete signals which place the Airborne Self Protection Jammer WRA-3 computer in a reprogram mode. In this mode a bootstrap loader program in the Airborne Self Protection Jammer WRA-3 computer saves and verifies software through either of the pair of MIL-1553 multiplex buses on board the aircraft.

After generating a master tape transport memory cartridge from a pre-programmed WRA-3 computer, the Advanced Memory Loader/Verifier provides load and verify capability for the Operational Flight Program and the User Data File software for the AN/ALQ-165 on board the aircraft.

USQ-131 Memory Loader/Verifier set is also being used to reprogram the AN/ALQ-165 Deceptive Electronic Countermeasures set on board the F/A-18 C/D aircraft and F/A-18 E/F aircraft. The USQ-131 Memory Loader Verifier is disclosed in U.S. Pat. Nos. 5,307,505; 5,349,685 and 5,390,356. While the Memory Loader Verifier disclosed in these patents includes download and file save features, current production USQ-131 Memory Loader Verifiers do not have these download and file save capabilities.

The F/A-18 C/D aircraft is generally used abroad with the foreign users not having access to VAX computer hardware and VAX based loading tools. However, the USQ-131 Memory Loader Verifier will be supplied to foreign users with the F/A-18 C/D aircraft. This, in turn, necessitates that the Operational Flight Program and the User Data File software files be in an IBM PC DOS compatible format.

SUMMARY OF THE INVENTION

The present invention overcomes some of the difficulties of the prior art including those mentioned above in that it comprises a highly effective utility program which provides the Operational Flight Program (OPF) and the User Data File (UDF) software files for an AN/ALQ- 165 Deceptive Electronic Countermeasures set in an IBM PC DOS compatible format.

The software program of the present invention comprises a personal computer based software utility program that emulates a Digital Equipment Corporation VAX computer based loader program. The software program reads Operational Flight Program and User Data File ATAC Bootstrap Loader format files from personal computer disk files. It writes ATAC Download Record format binary files to a personal computer disk.

The output file format provided by the software program of the present invention comprises one contiguous block of data having one or more data records, one BIT table and one End-of-File record.

DETAILED DESCRIPTION OF THE PREFERRED EMBODIMENT

Figure 1:
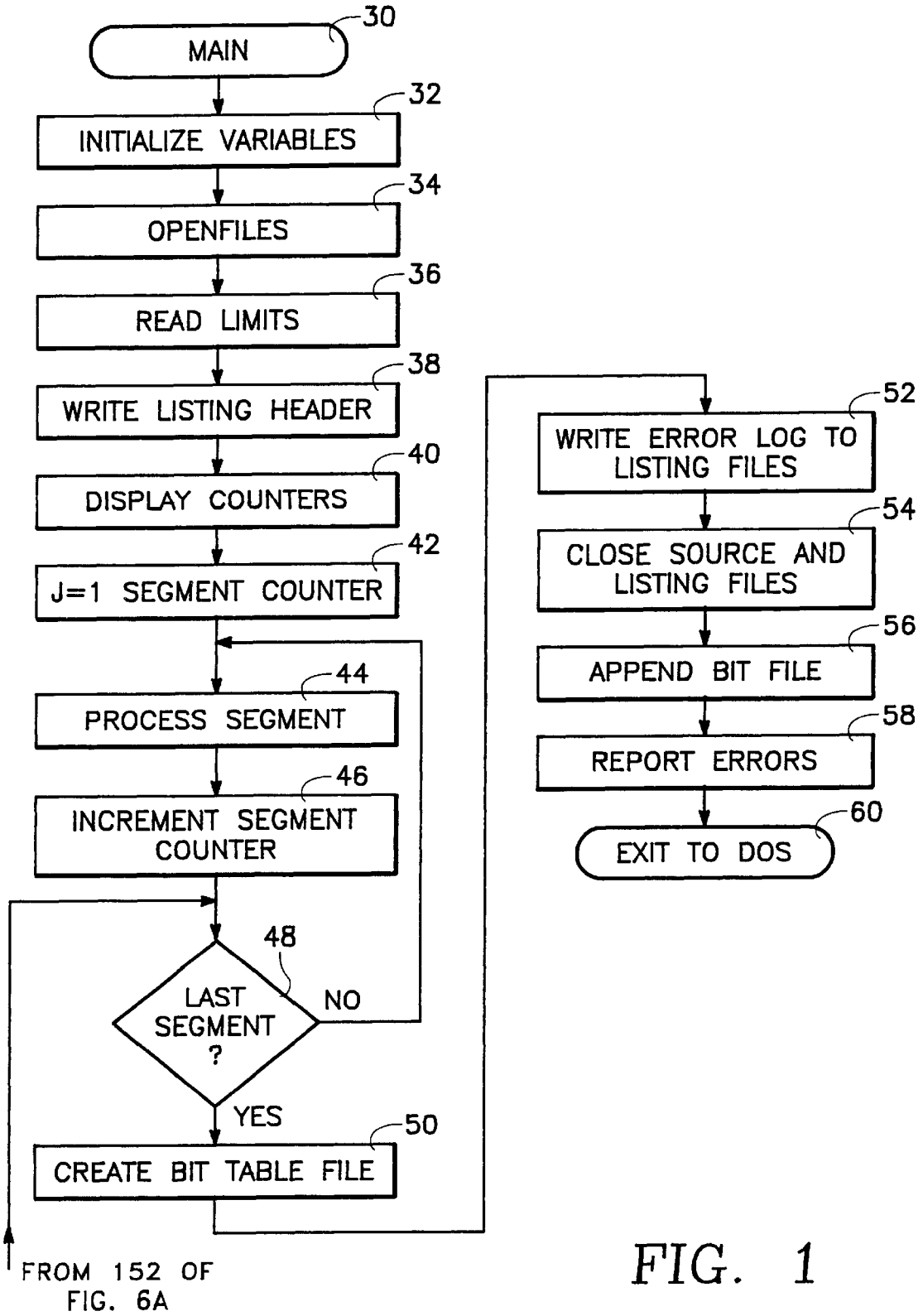
FIG. 1 is a flow chart of the MAIN program module for the PCLOADER program of the present invention.

Referring to FIGS. 1–21, there are two computer software programs to provide Memory Loader/Verifier Set (MLVS) compatible Airborne Self Protection Jammer software loads. The Airborne Self Protection Jammer is the AN/ALQ- 165 Deceptive Electronic Countermeasures set.

The PCLOADER program (flowchart illustrated in FIGS. 1–13) is a PC based software utility program that emulates a VAX computer based loader program. The PCLOADER program reads Operational Flight Program and User Data File ATAC Bootstrap Loader format files from PC disk files. It writes ATAC Download Record format binary files to PC disk.

The output file format comprises one contiguous block of data having one or more data records, one BIT table and one End-of-File record. The PCLOADER program requires burn limit data from a command block format file and performs a substantial portion of the data processing described in PVSW-85 "EEPROM Loader Requirements", which will be described in detail below. The RRT program (flowchart illustrated in FIGS. 14–21) is a PC based formatting utility program that appends MIL-STD-2217 header-data-trailer records to binary ATAC Download Record files for the Operational Flight Program and User Data File software for the AN/ALQ-165 Deceptive Electronic Countermeasures set.

The files are provided with a default extension of (.RRT). The RRT program also provides LOAD ID transaction files. One or more Operational Flight Program and User Data File RRT files are linked with a Load Identification transaction file using the DOS copy command to produce a single Operational Flight Program and User Data File load file.

The PCLOADER program reads source files which are stored by the ATAC Linker in an ATAC Bootstrap Loader format which is a packed ASCII file. The sixteen bit words which comprise the original binary file were divided into one four bit word and two six bit words with word S1 including bits 15–12 therein, word S2 including bits 11–6 therein and word S3 including bits 5–0 therein.

Each word is biased by 20 (hexadecimal) forming three seven bit psuedo-ASCII characters in the range from 20 to 5F (hexadecimal). This format splits one ATAC word into three bytes and biases each byte by 20 hexadecimal. The Input Format for each field of the PCLOADER program is: Input Format:

| Character | Contents |
|---|---|
| 1 | S1 + 20 (hex) |
| 2 | S2 + 20 (hex) |
| 3 | S3 + 20 (hex) |

A decode function reads three 16 bit data words from the source file, and treats successive words as characters S1, S2 and S3. The decode function subtracts 20H from each character and then combines the three character S1, S2 and S3 multiplying each character by the appropriate power of two to reconstitute the original 16 bit ATAC data word generated by the ATAC Linker.

The record structure of the ATAC Bootstrap Loader format file is illustrated below. Input Record:

| Character Position | Contents | Function |
|---|---|---|
| 1 | Data | Characters appropriately biased by 20 (Hex) |

Where 'data' is composed as follows:

| Word | Contents |
|---|---|
| 1 | Negative record length, 2-N where N is the total number of 16 bit words in the record. |
| 2 | Function code: −1 is end of file. |
| 3 | Memory address of where to store first program data word contained in record. |
| 4 to N-1 | Absolute object program words. |
| N | Checksum formed by the exclusive OR of record words 2 through N-1. The checksum is initialized to zero prior to processing a record and each data word is exclusive OR'ed with the checksum in the sequence encountered in the record. |

Word one represents the negative record length, where 2-N is the total number of 16 bit words in the record. Currently, the record format existing on VAX computers using a VMS operating system includes a BEL character (07 Hexadecimal) which functions as the record terminator. The BEL character is not included in the 2-N record length. Since any source file is converted to an MS DOS file format before processing by the PCLOADER program, source files will include MS DOS carriage controls. This results in each record having CR/LF (OD,OA Hexadecimal) as the terminating characters. MS DOS programs reading the source file use line oriented file input, and only process characters up to the length indicated in the record length field, ignoring the BEL character and CR/LF pair of ASCII characters.

Word two of the ATAC Bootstrap Loader format record is the Function Code. This is a predetermined code which tells the ASPJ bootstrap loader the memory page (RAM page) for storing the data record. Some source files contain an absolute memory page in this field. Processing of this field by the PCLOADER Program is in accordance with PVSW-85 EEPROM Loader Requirements.

At this time it should be noted that whenever the Airborne Self Protection Jammer is powered up, software is down loaded from EEPROM (which is the storage medium) into RAM and then the software executes.

Word three represents the memory address to store the first data word contained in this record. Words four to N-1 are the absolute object code data words.

Words four to N-1 are the record's checksum formed by the exclusive OR of record words two through N-1. The checksum is initialized to zero prior to processing a record and each data word is exclusive OR'ed with the checksum in the sequence encountered in the record. The PCLOADER program calculates the record checksum as it reads record characters. If the calculated checksum does not match the stored checksum a checksum error is reported.

A file consist of one or more records terminated with an end of file record which has the following information.

| | Character Position | Contents | Function |
|---|---|---|---|
| Word 1 | 1–3 | 2F,5F,5F | FFFF, negative word count |
| Word 2 | 4–6 | 2F,5F,5F | FFFF, end of file function code |
| Word 3 | 7–9 | 2F,5F,5F | start address of record |

The PCLOADER program converts an ATAC download formatted file to a 16 bit internal ALQ-165 format and then writes the resulting data to the listing file in ASCII format. This utility function is useful for diagnosing assembly and linking errors that may occur when creating multi-bank ATAC programs. Files produced by the ATAC loader (linker), files produced by the banking processor, files produced by the UDF generator, or files produced by the PE-1 and PE-2 patch utilities can be used as input to this program. In each case an English version of the record structure appears in the listing file.

It should be noted that the Airborne Self Protection Jammer's EEPROM memory is a component of the PV PE-1 and PE- 2 processor boards of the Airborne Self Protection Jammer.

The listing file includes a header showing the program title and version, date, source file name, output binary MLV file name, and a command block file name. The header record for the file is displayed, followed by each converted record, and terminated by an End of file record. Each converted record consists of the record sequence number, the record negative word count, the bank indicator function code or memory page, the starting memory address, all data words of the record, and the record checksum value.

The Command Block is a user input table which defines the size and location in RAM of the data to be processed. The Command Block includes definitions for up to 32 segments of data to be programmed and/or verified. The PCLOADER program reads a file with the default extension of ".LIM" and converts the Command Block data structure to an array of records where each array index has fields to define one ATAC Download Record.

The File ID, which is the first word of the Command Block, defines the destination of the data. The File ID indirectly defines the first EEPROM block to be programmed. The File ID is used as an index into the File Address Table to get the desired file address table (FAT) entry. The FAT entry is used as an index into the Block Address Table (BAT) and the BAT entry directly defines the EEPROM block.

The remainder of the Command Block define up to 32 segments of data to be copied from RAM and programmed into EEPROM. The PCLOADER program uses a source file instead of RAM as its data source, and writes its output to an MLV file in the same format the data would normally be stored in EEPROM. This is required since Airborne Self Protection Jammer hardware is not being used. The Command Block contains a variable number of segment definitions. In addition, the Command Block has a variable length with a maximum of 130 words (1+32×4+1=130).

The Command Block format is illustrated as follows.

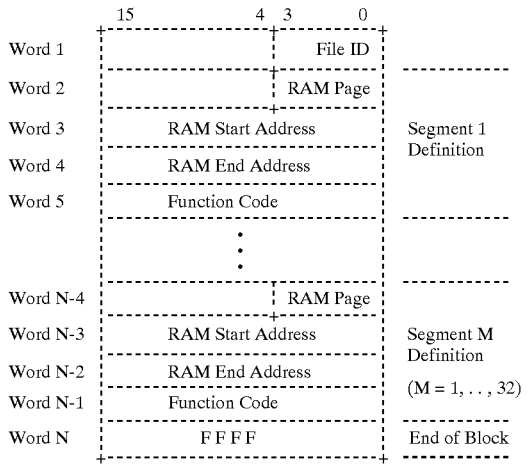

Each Segment definition (Segments 1 . . . M) of the Command Block consist of a RAM page, RAM start address, RAM end address and Function code. The first three items of a Segment definition describe the location and size of a data segment. The Function code defines the format in which the data is written to EEPROM. The end of a Command Block is marked by an FFFF.

The Block Address Table (BAT) indicates where PE-1/PE-2 will write the data. This table includes up to 480 entries, one for each memory block. An entry is a combined page and address pointer for a 512-word memory block. The 4 LSB's (Least Significant Bits) define the page and the 4 MSB's (Most Significant Bits) define the address. The four MSB's define the 4 MSB's of the address with the 12 LSB's of the address being defined as zero. Data is moved from RAM to EEPROM Memory Blocks in a sequence defined by the order of the pointers in the BAT.

The File Address Table (FAT) contains a Starting Block Number for each of the 16 possible file types (eg. OFP, UDF, Overlays, BIT UDF, Flight-Line Checkout UDF). A Starting Block Number indicates which 512-word block of EEPROM will get programmed first. The Block Address Table defines the following blocks. The first 8 entries are used for OFP and related files and the last 8 entries are used for UDF and related files. Word 1 of the Command Block, File lD, is used as an index into the FAT. The Block Address Table is illustrated as follows.

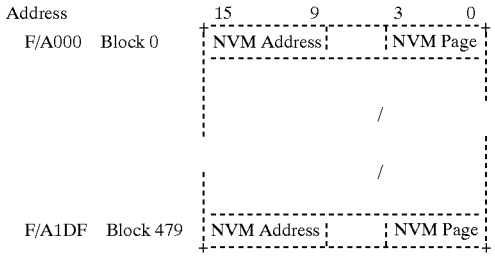

It should be noted that the complete NVM Address is attained by placing zeroes in bits 0 through 8 of the address.

The File Address Table and Load ID's are illustrated as follows:

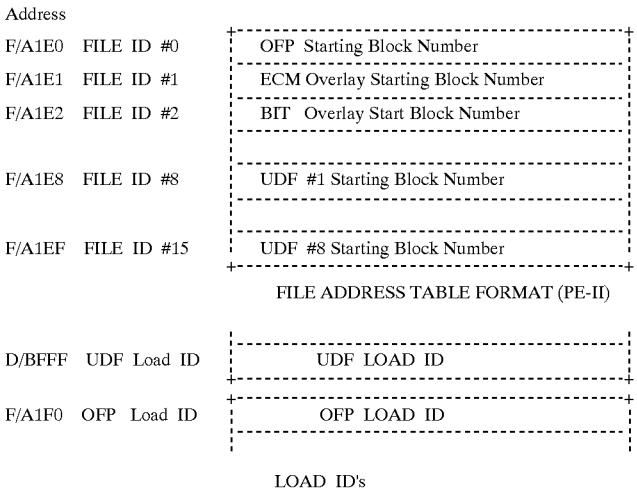

The PCLOADER program writes data to the output file in a format that the ATAC expects to see in EEPROM. This format which is the ATAC Download Record Format is illustrated as follows.

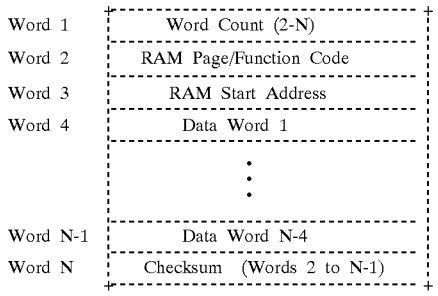

A Download Record consists of a Word count, RAM Page/Function Code, RAM Starting Address, Data Words and a Checksum. The Word count, RAM Page/Function Code, RAM Starting Address and Checksum are identified as the "overhead" words.

The word count is in a "2-N" format where N is the number of words in the record including the overhead words. The RAM Page and RAM Starting Address define where the Data Segment is to be written. There are N-4 Data Words in a Download Record. The checksum calculated by XOR'ing the data defined by the segment definition along with the Page/Function Code and Address, that is words 2 thru N-1 of the constructed Download Record.

Certain records have a different header type. These records have a Function Code instead of a RAM Page. All of the header information for a Download Record, except the Checksum, can be obtained directly from the Command Block. The Word Count is:

Word Count =2-(RAM End Address - RAM Start Address +5)

The RAM Page/Function Code and RAM Address is defined in one of two ways depending on the value of the Function Code in the Command Block. If the Function Code in a Segment Definition is zero, then the segment definition is for an OFP and the Download Record header words are:

Page/Function Code =RAM Page from Segment Definition

Address =RAM Address from Segment Definition.

If the Function Code in the Segment Definition is greater than zero, then the segment definition is for a UDF and the Download Record header words are:

Page/Function Code =Function Code from Seg. Definition Address =0000

The first Download Record starts in EEPROM as defined by the File ID. All Download Records begin on an even EEPROM 64-word page boundary. To accomplish this the PCLOADER program writes all Download Records with zeroes padded after the Checksum so that each record ends on a page boundary.

The BIT table is the a summary of the size and checksums of the ATAC download records. There is one entry in the BIT Table for each ATAC download record that exist for a particular file. For example, UDF may have three ATAC download records which corresponds to three RAM Segments. The BIT Table data is used by the system to perform continuous background checksum test if each segments data integrity.

The BIT Table has a pair of checksums. The BIT Table has a checksum of each ATAC download record as well as a checksum of the BIT Table. When the Airborne Self Protection Jammer executes a load operation, it calculates the checksum of each download record and if there is not a match with the checksum provided by the BIT Table then an error is flagged followed by another attempt at the load operation. The Bit Table Format with an EOF record is illustrated as follows.

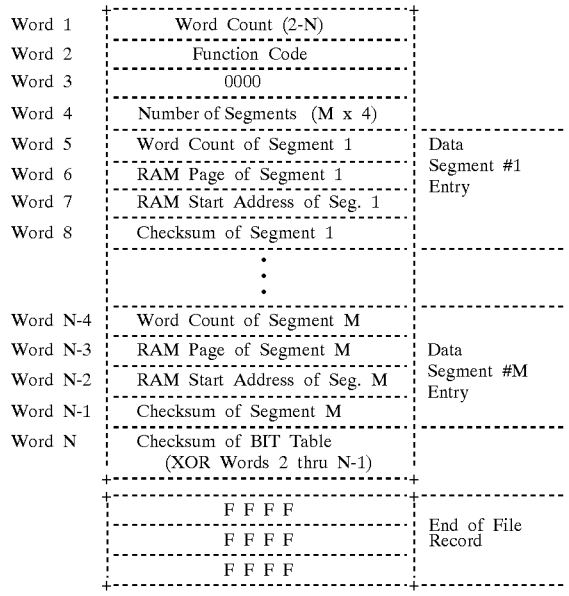

When all Data Segments have been programmed and written to the output file, a BIT Table must be placed after the last data segment. The five overhead words of the BIT Table Download Record are:

| | | |
|---|---|---|
| Word 1 | Word Count = | 2 − N, N = (Number of segments × 4) + 5 |
| Word 2 | Function Code = | 12H for OFP (File ID 0–7)<br>14H for UDF (File ID 8–15) |
| Word 3 | Not Used = | 0000 |
| Word 4 | Segment Count = | Number of segments × 4 |
| Word N | Checksum = | XOR of Words 2 through N-1 |

Following Word 4 is a BIT Table Data Segment Entry for each Data Segment. A Data Segment Entry consists of a Word Count, RAM Page, RAM Address and Checksum. The Word Count of a Data Segment Entry is:

Word Count =RAM End Address—RAM Start Address +1 The RAM Page and RAM Address are obtained directly from the Segment Definition in the Command Block. The Checksum in a Data Segment Entry is an XOR of the data only. It does not include the Page/function Code or Address.

An End-of-File Record must be written after the BIT Table in the output file. This is used during download to indicate that all records have been downloaded out of EEPROM. The End-of-File Record is written directly after the BIT Table starting at the beginning of the next 64-word EEPROM page with zeroes between it and the BIT table.

Referring to FIG. 1, FIG. 1 is the top level flow or main program for the PCLOADER program of Appendix A. Program step 32 initializes program variables, program step 34 opens source files and output files according to user input, and program step 36 reads the Limit file which includes the Command Block. During program step 38 the header is written. The data is processed beginning at program step 44 which is the PROCESS SEGMENT subroutine of FIG. 4.

Figure 2:
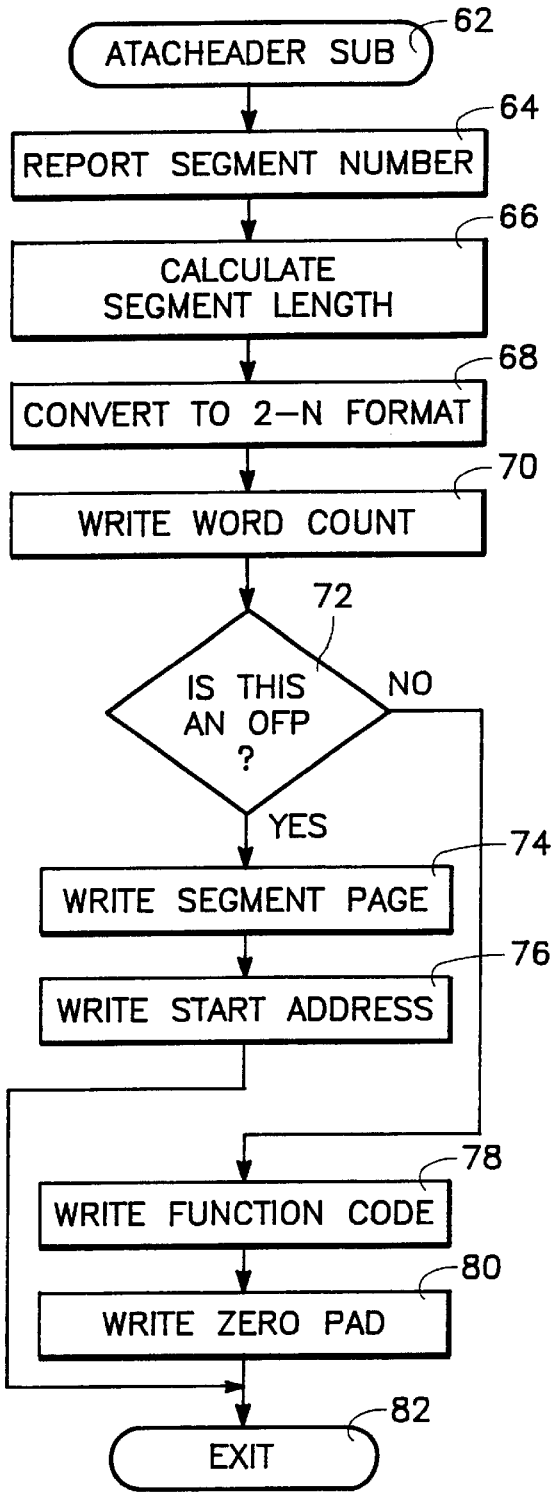
FIG. 2 is a flow chart of the ATACHEADER subroutine for the PCLOADER program of the present invention.
Figure 4:
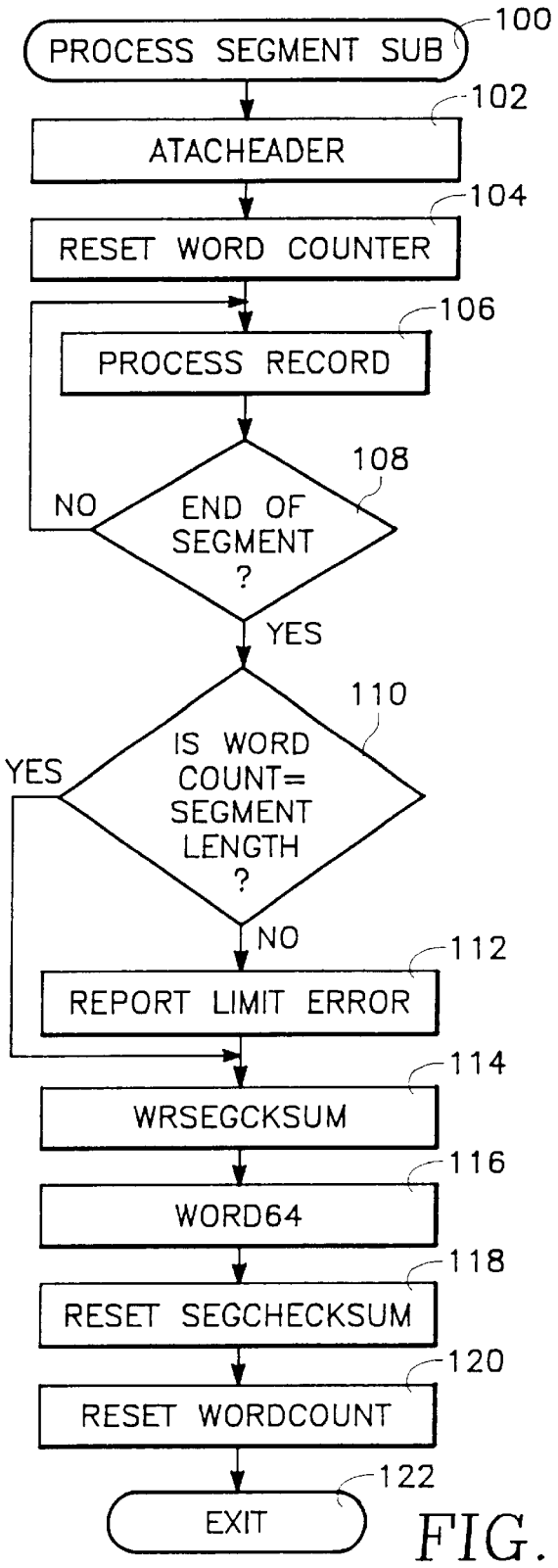
FIG. 4 is a flow chart of the PROCESS SEGMENT subroutine for the PCLOADER program of the present invention.

Referring to FIGS. 1, 2 and 4, from the PROCESS SEGMENT subroutine of FIG. 4, the ATACHEADER subroutine of FIG. 2 is entered (program step 102). The ATACHEADER subroutine of FIG. 2 (program step 62, FIG. 2) processes/calculates words one, two and three of the ATAC download record which are the Word Count, RAM Page/Function Code and the RAM start Address. For each ATAC download record or segment, the ATACHEADER subroutine of FIG. 2 is called until the last segment is processed (program step 48).

It should be noted that the segment counter is incremented during program step 46. It should also be noted that there may be from three to eight ATAC download records to be processed by the PC based ATAC Loader program of.

Figure 6A:
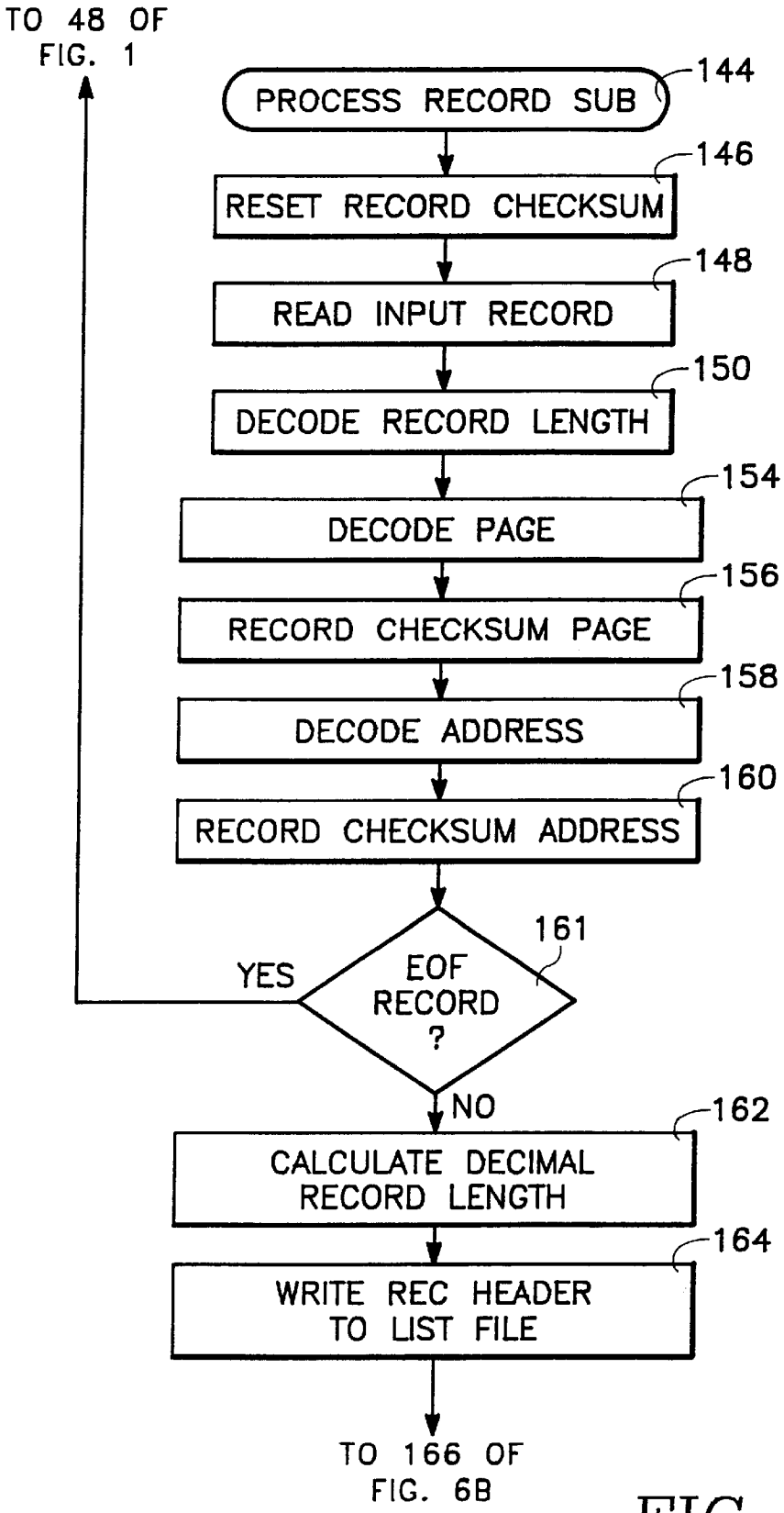
FIGS. 6A–6B is a flow chart of the PROCESS RECORD subroutine for the PCLOADER program of the present invention.
Figure 6B:
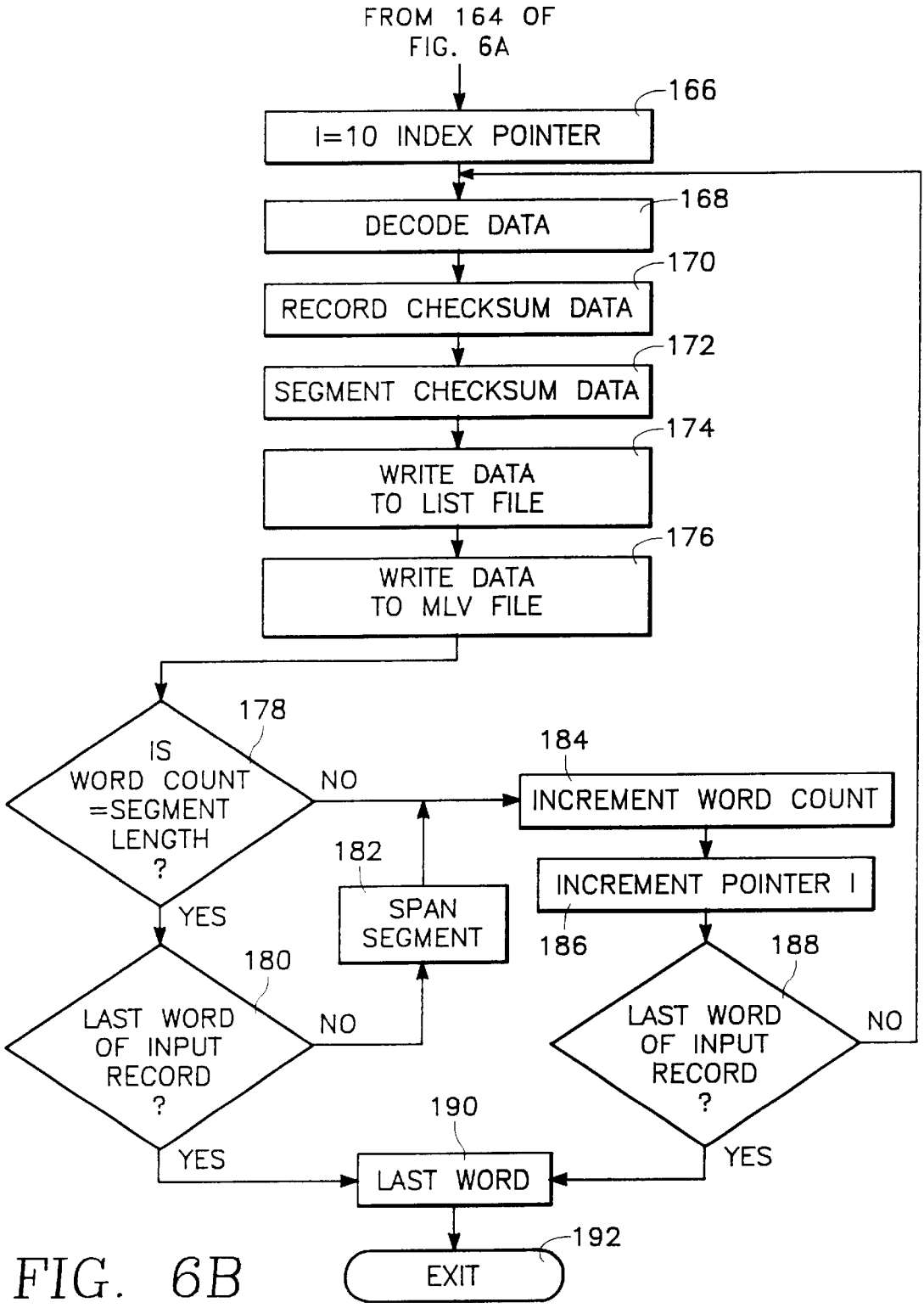

Referring to FIGS. 1 and 4, the PROCESS SEGMENT subroutine (program step 100, FIG. 4) is called for each Segment 1 through M defined in the Command Block and builds the ATAC download record. The ATACHEADER subroutine of FIG. 2 (program step 102, FIG. 4) calculates words one, two and three of the ATAC download record. The word counter is reset during program step 104. During program step 106, the PROCESS RECORD subroutine of FIGS. 6A–6B is entered. The PROCESS RECORD subroutine of FIGS. 6A–6B reads multiple records of data and it writes the data portion of the ATAC download record which includes words 4 to N-1 of the ATAC download record.

During program step 146, the record checksum is reset, which is the Exclusive-OR checksum for each word in the record of the input file. The record checksum is the last word of the ATAC download format which is Word N. The input record is read during program step 148. Each input record has a length field and is defined as follows: Input Record:

| Character Position | Contents | Function |
|---|---|---|
| 1 | Data | Characters appropriately biased by 20 (Hex) |

Where 'data' is composed as follows:

| Word | Contents |
|---|---|
| 1 | Negative record length, where N is the total number of 16 bit words in the record. |
| 2 | Function code: −1 is end of file. |
| 3 | Memory address of where to store first program data word contained in record. |
| 4 to N | Absolute object program words. |
| N | Checksum formed by the exclusive OR of record words 2 through N-1. The checksum is initialized to zero prior to processing a record and each data word is exclusive OR'ed with the checksum in the sequence encountered in the record. |

A file consist of one or more records terminated with an end of file record which has the following information.

| | Character Position | Contents | Function |
|---|---|---|---|
| Word 1 | 1–3 | 2F,5F,5F | FFFF, negative word count |
| Word 2 | 4–6 | 2F,5F,5F | FFFF, end of file function code |
| Word 3 | 7–9 | 2F,5F,5F | start address of record |

During program step 150 word one is decoded, that is, the record length is decoded. The record length is the number of sixteen bit words in the current record. There may be, for example 37 sixteen bit words in a record.

The calculation of the checksum for the ATAC Bootstrap Loader record begins at program step 156. The start address which is word three is decoded during program step 158. The start address is included in the calculation of the checksum during program step 160.

During program step 161 word two is decoded, that is a check is made for the end of file. The character 2F,5F,5F indicates an end of file record.

When an end of record is not found the PROCESS RECORD subroutine proceeds to program step 162. During program step 162 the decimal record length is calculated.

During program step 164 the record header is written to the listing file which is plain text or English file for the user of the present invention.

During program step 166 an index counter is set to ten since the first nine nibbles/characters comprise the record overhead which is the word count, memory page and start address of record. The calculation performed during this program step is the record length times three with an offset of ten.

During program step 168, a sixteen bit data word is decoded with the checksum being updated during program step 170. This sixteen bit data is also included in the segment checksum calculation for the ATAC download record (program step 172.

During program steps 174 and 176 the data is written respectively to the listing file and the output binary MLV file which generally includes 3–8 ATAC download records.

Program step 178 compares the processed word count to the segment length which is the word count obtained from the limit file. If the entire word count has not been processed, the word count is incremented (program step 184), the index pointer is incremented (program step 186) and a determination is made as to whether this is the last word of the input record (program step 188). It should be noted that the last word of the input record is the record checksum.

If a determination is made that this is not the last word of the input record then the next sequential sixteen bit data word of the input record is processed.

Referring now to FIG. 4, when the end of a segment has been reached (program step 108) and the word count equals the segment length (program step 110), the PCLOADER program A proceeds to program step 114 where the checksum is written into the MLV file and also provided to a temporary file which is used to create the bit table.

During program step 116, word 64 pads the start of the next segment on even 64 word boundaries. Word 64, in turn, provides a variable number of zeros to the output file.

Program step 118 resets the segment checksum variable while program step 120 resets the word count followed by an exit from process segment subroutine (program step 122).

Figure 3:
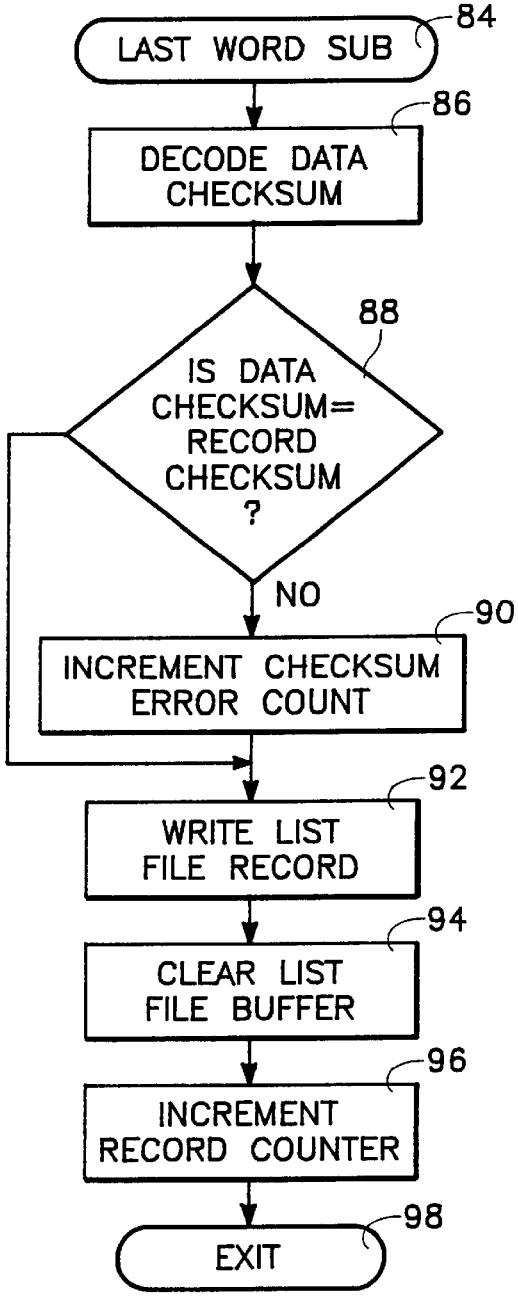
FIG. 3 is a flow chart of the LAST WORD subroutine for the PCLOADER program of the present invention.

Referring to FIG. 3 the last word subroutine includes program steps 84 through 98 and is used to compare the calculated checksum to the input file's record checksum. Any difference indicates that an error occurred in reading or decoding the ATAC bootstrap loader format file. During program step 92, the record checksum and the calculated checksum are written to the listing file.

Figure 5:
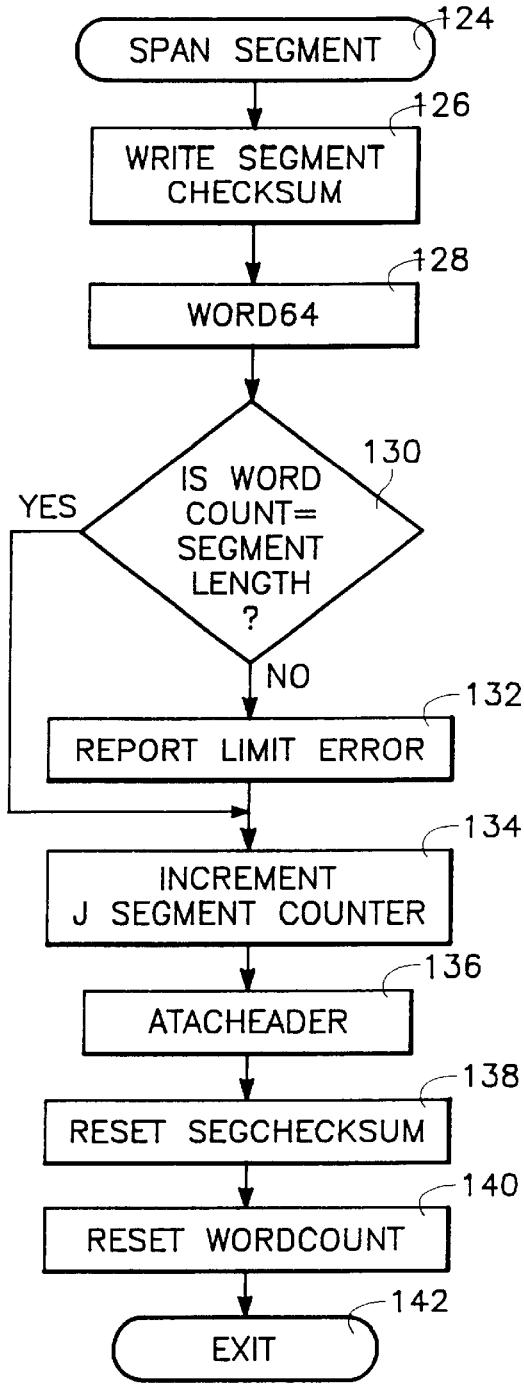
FIG. 5 is a flow chart of the SPAN SEGMENT subroutine for the PCLOADER program of the present invention.

Referring to FIG. 5, the span segment subroutine includes program steps 124 through 142 and is used to process a segment that starts in the middle of an input record.

Figure 7:
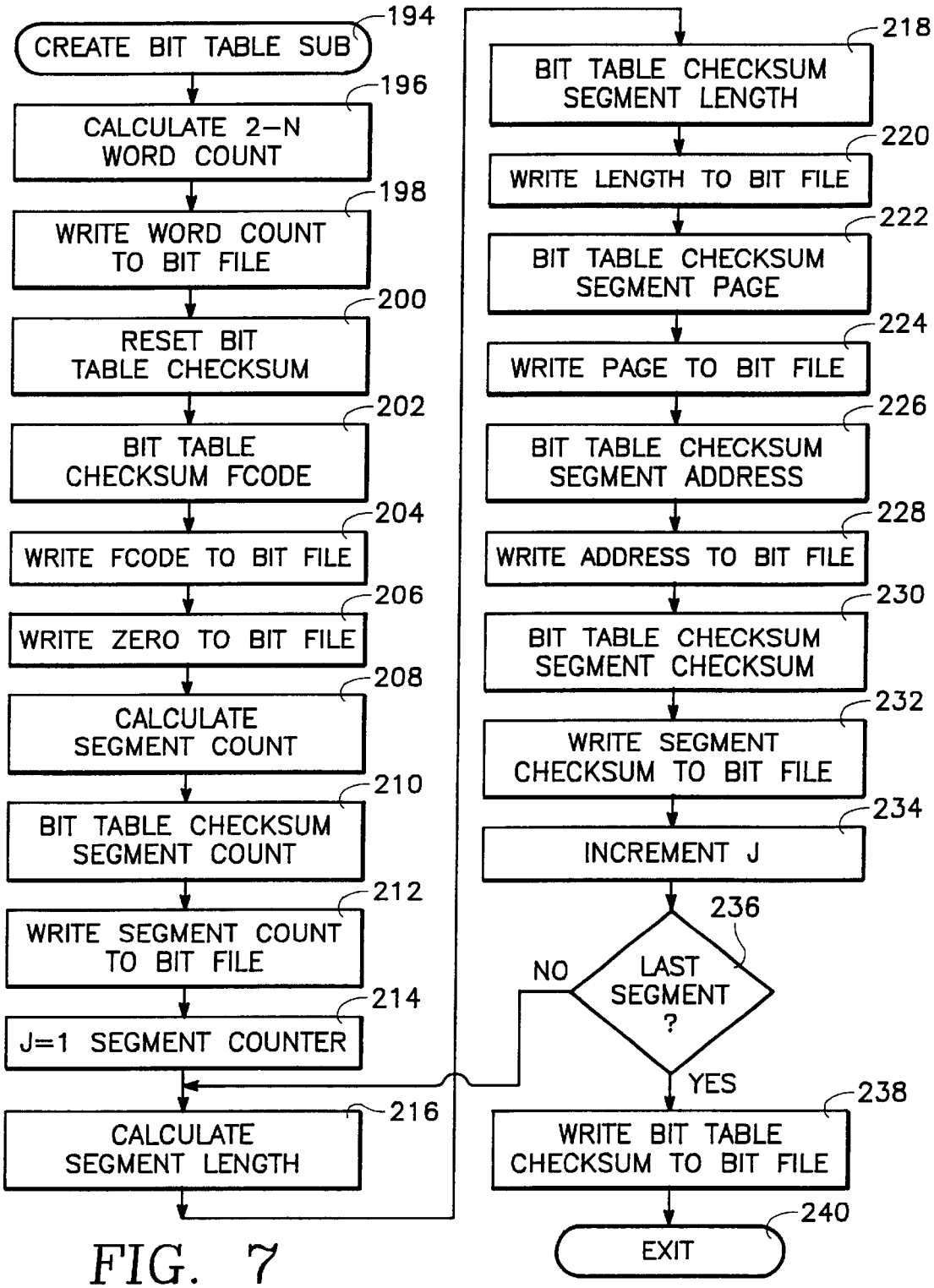
FIG. 7 is a flow chart of the CREATE BIT TABLE subroutine for the PCLOADER program of the present invention.

Referring to FIG. 7, the Create Bit Table subroutine includes program steps 194 through 240 and is used to create the BIT table which is a summary of the word count and checksums for the ATAC download records. The Bit Table is written to a separate temporary bit table file. In addition, the Bit Table overhead words are calculated.

Program step 196 calculates the 2-N Word Count which is word 1 of the overhead record. The Word Count is written to the Bit file during program step 198.

The Bit Table Checksum is reset during program step 200 to start the checksum calculation for the Bit Table data. Program step 202 determines the Bit Table Function Code which is word 2 of the overhead record. The Bit Table Function Code is written to the Bit file during program step 204.

Program step 208 calculates the Segment count which is word 4 of the overhead record. The Segment count is written to the Bit file during program step 212.

During program step 216, the segment length is calculated. The segment length which is the word count of the segment is written to the Bit file during program step 220.

The memory page of the segment is written to the Bit file during program step 224. The memory start address of the segment is written to the Bit file during program step 228.

The checksum for the segment is written to the Bit file during program step 232. The checksum for the Bit Table is written to the Bit file during program step 238. The checksum for each segment and the checksum for the Bit Table are processed during program steps 202, 210, 218, 222, 226 and 230 of the Create Bit Table subroutine.

Figure 8:
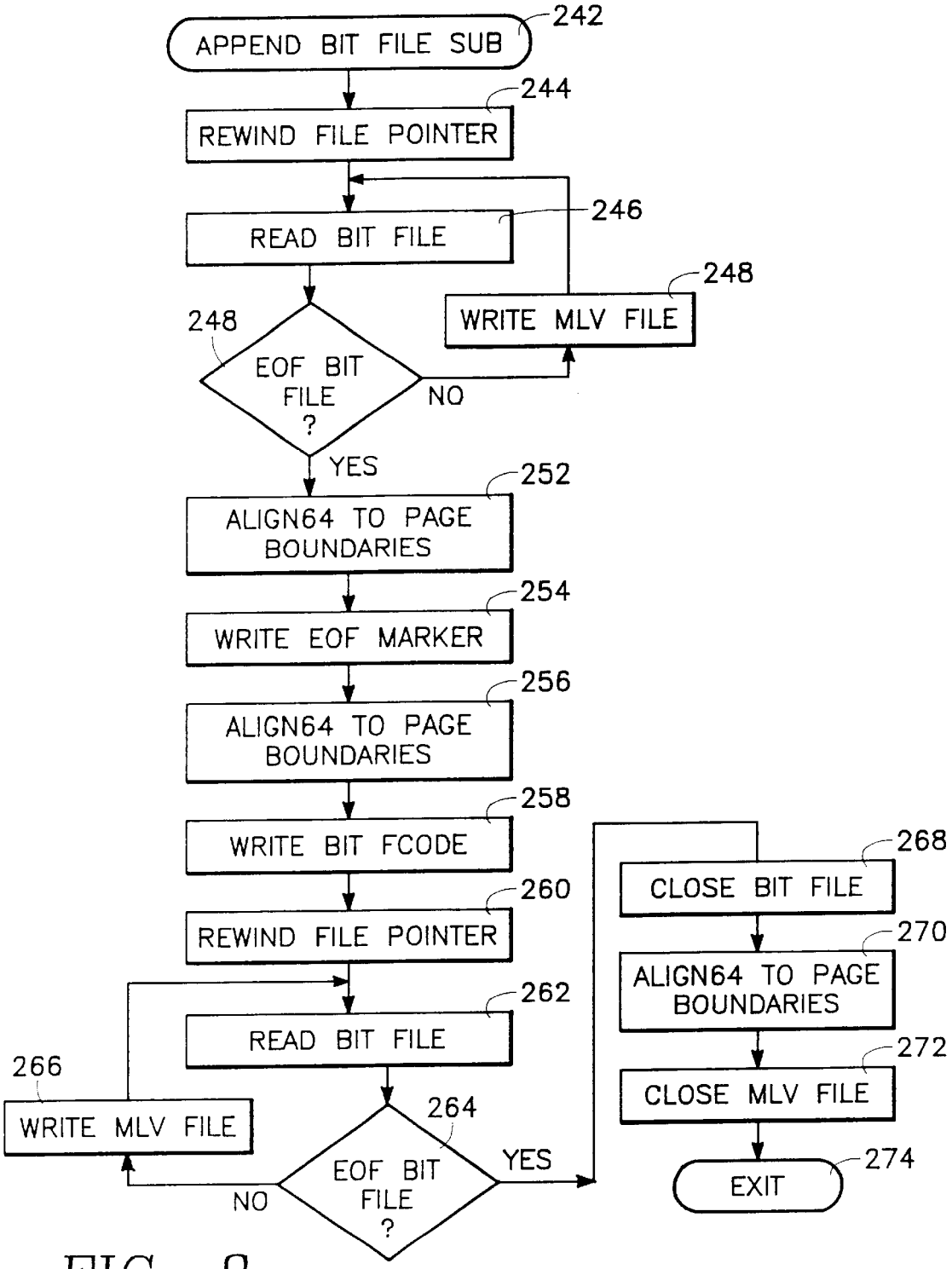
FIG. 8 is a flow chart of the APPEND BIT FILE subroutine for the PCLOADER program of the present invention.

Referring to FIG. 8, the Append Bit File subroutine includes program steps 242 through 274. The Append Bit File subroutine appends the Bit file created by the Create Bit Table subroutine to the output file which is a memory image loaded into EEPROM of the Airborne Self Protection Jammer.

Figure 9:
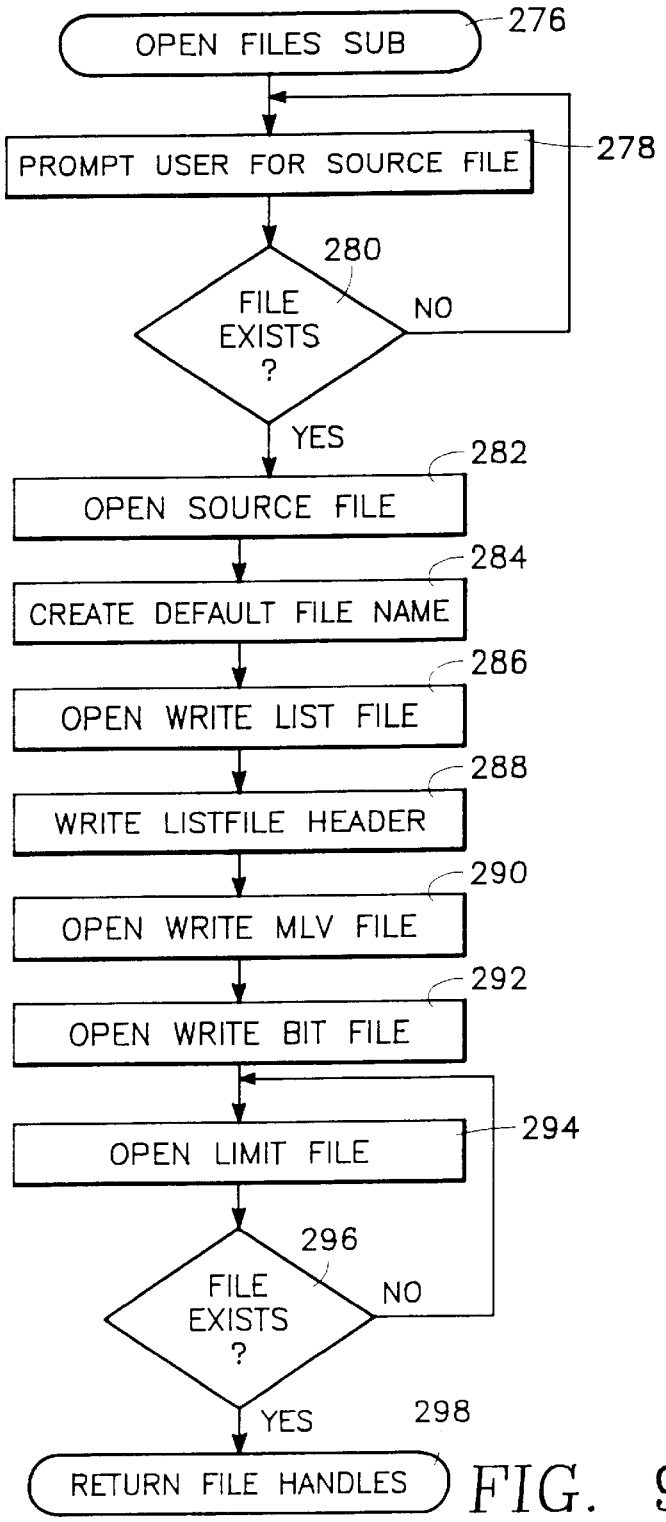
FIG. 9 is a flow chart of the OPEN FILES subroutine for the PCLOADER program of the present invention.
Figure 10:
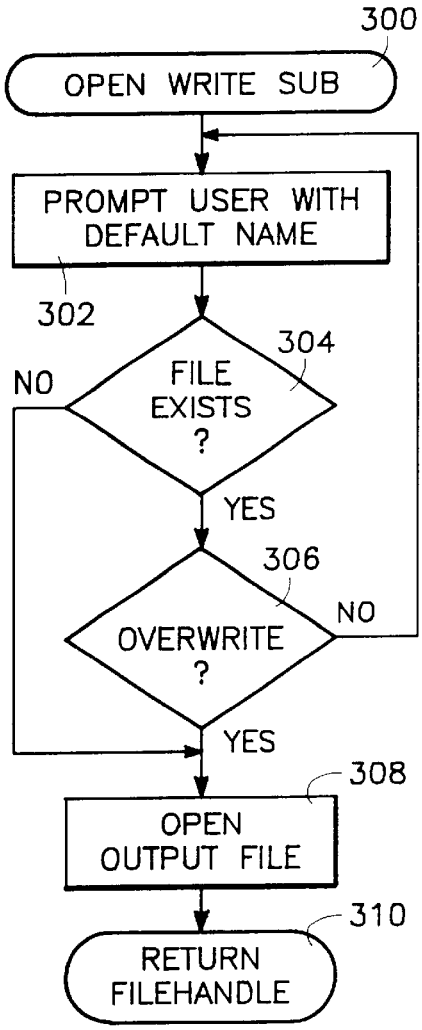
FIG. 10 is a flow chart of the OPEN WRITE subroutine for the PCLOADER program of the present invention.

Referring to FIG. 9, the Open File subroutine includes program steps 276 through 298. The Open File subroutine opens the source file at program step 282 and also opens the limit file at program step 294. At program steps 286, 290 and 292, the PCLOADER program jumps to the Open Write subroutine of FIG. 10 which is a subroutine for opening a file for write access. The Listing file, the MLV file and the Bit file are respectively opened at program steps 286, 290 and 292 for write access.

Figure 11:
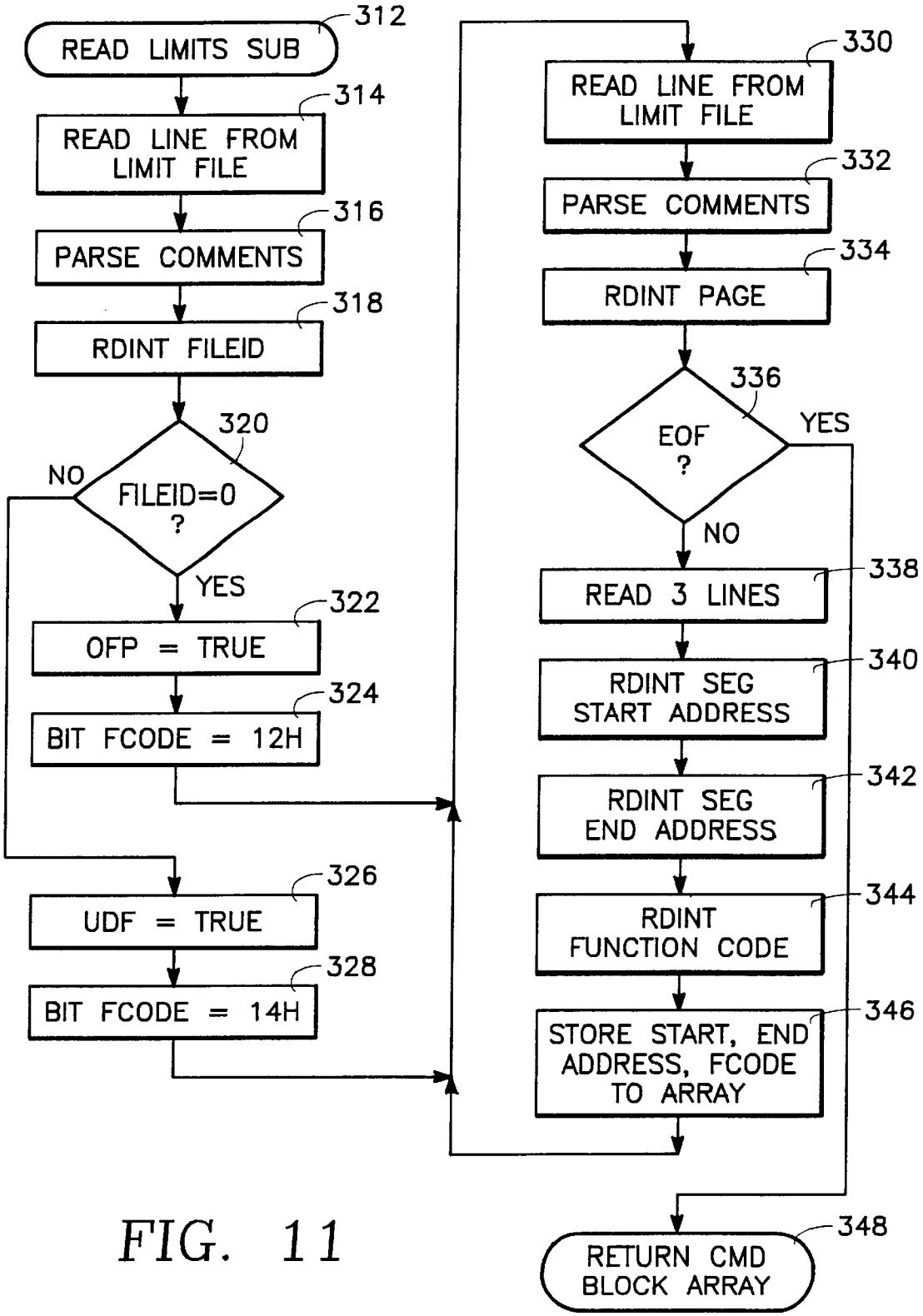
FIG. 11 is a flow chart of the READ LIMITS subroutine for the PCLOADER program of the present invention.

Referring to FIG. 11, the Read Limits subroutine includes program steps 312 through 348 and is used to read the Limit file for obtaining Command Block information.

At this time it should be noted that the Open Files subroutine of FIG. 9 is accessed from program step 34 of the Main program illustrated in FIG. 1. Similarly, the Read Limits subroutine of FIG. 11 is accessed from program step 36 of the Main program illustrated in FIG. 1.

Figure 12:
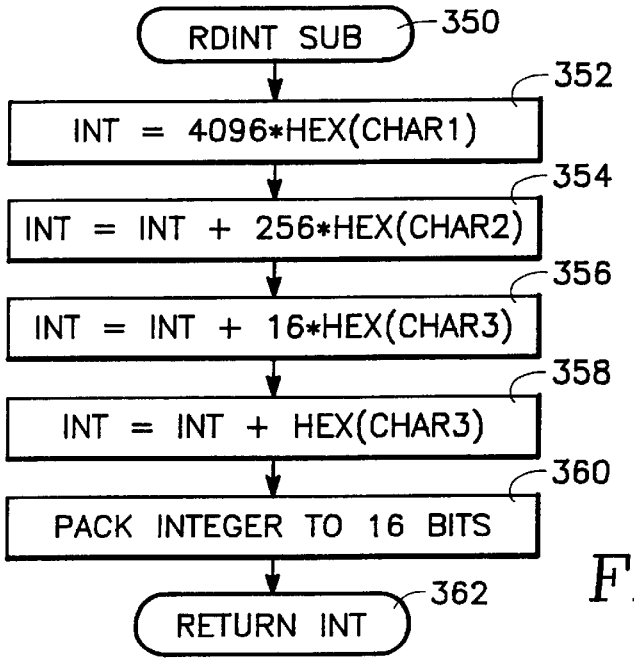
FIG. 12 is a flow chart of the RDINT subroutine for the PCLOADER program of the present invention.

Referring to FIG. 12, the RDINT subroutine converts a four digit hexadecimal number to a sixteen bit word. This subroutine is accessed from program steps 340, 342 and 344 of the Read Limits subroutine of FIG. 11.

Figure 13:
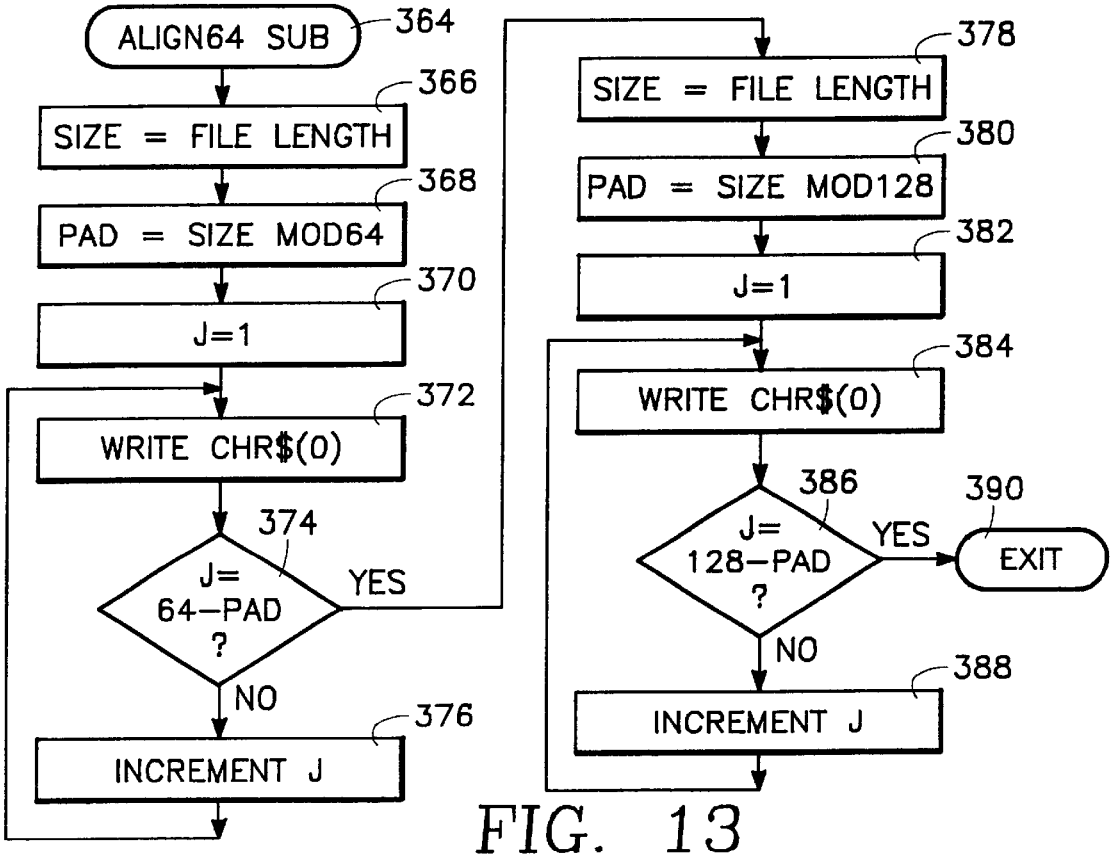
FIG. 13 is a flow chart of the ALIGN64 subroutine for the PCLOADER program of the present invention.
Figure 14A:
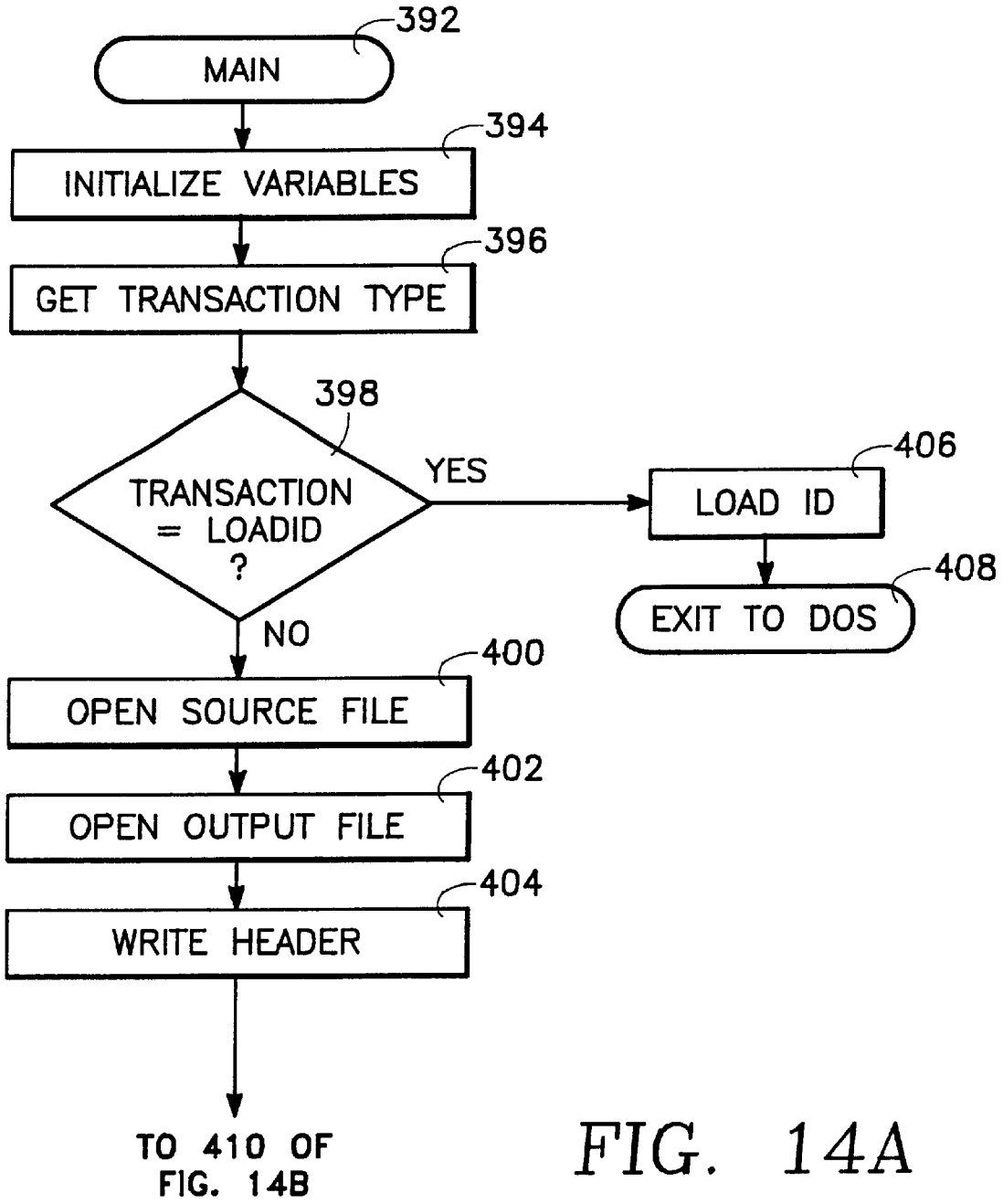
FIGS. 14A–14B is a flow chart of the MAIN program module for the RRT program of the present invention.
Figure 14B:
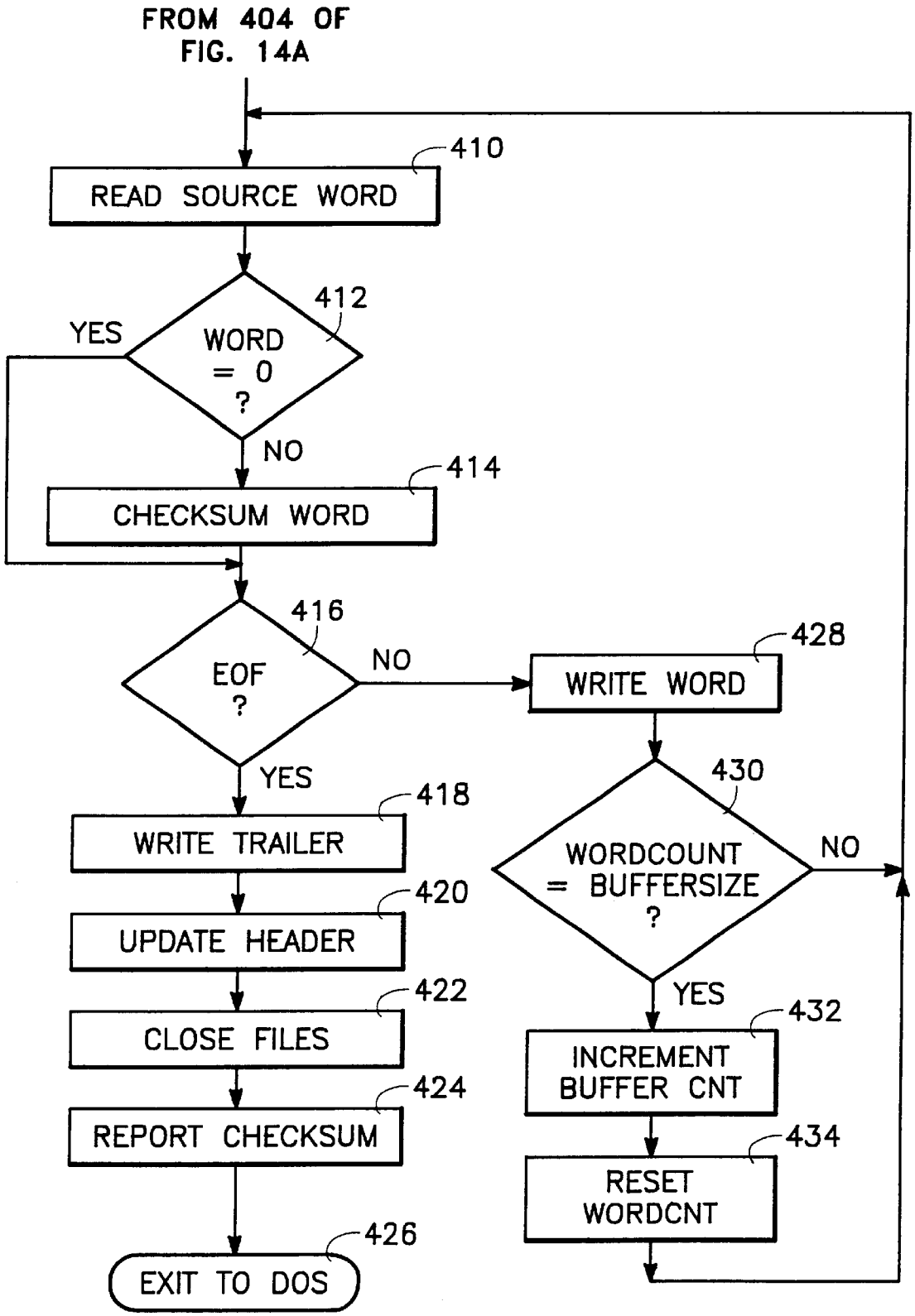
Figure 15:
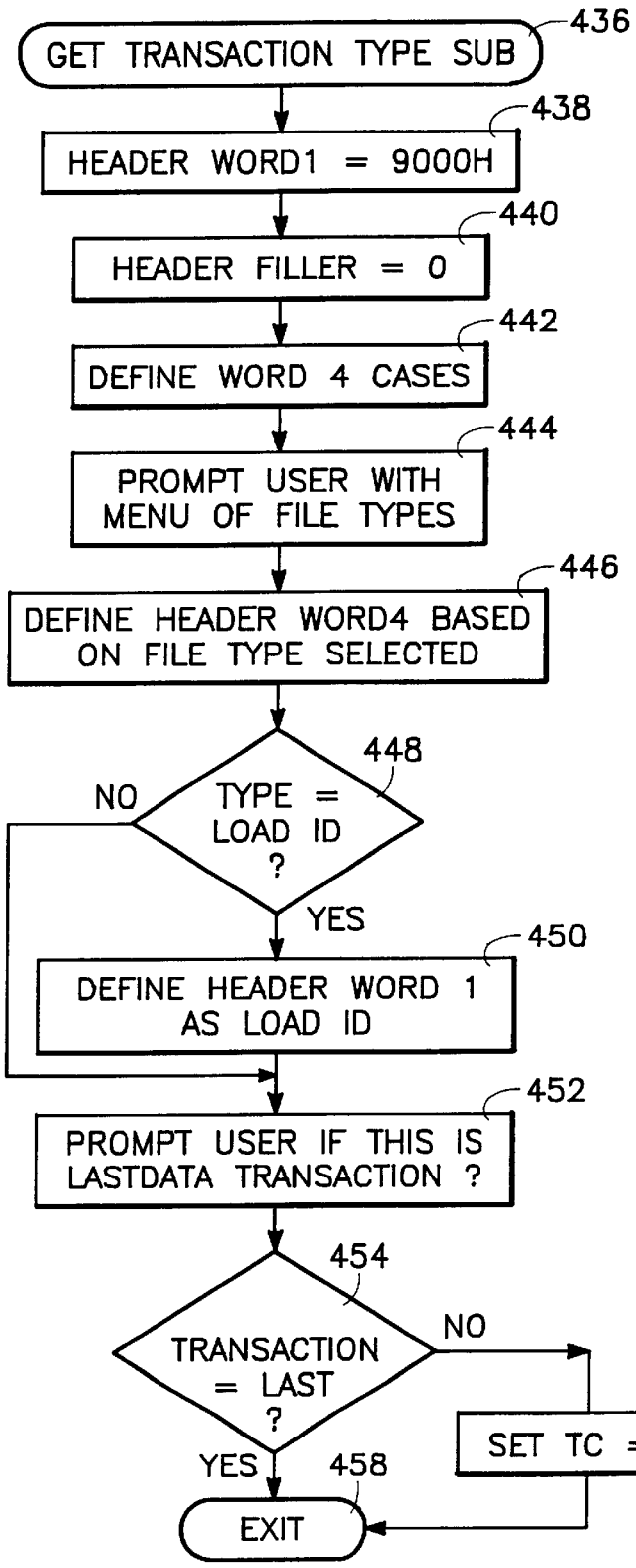
FIG. 15 is a flow chart of the GET TRANSACTION TYPE subroutine for the RRT program of the present invention.
Figure 16:
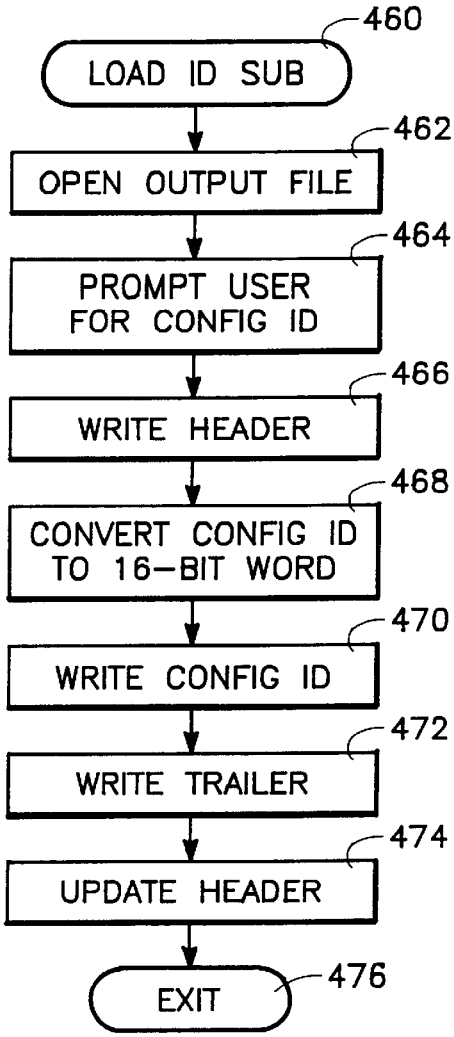
FIG. 16 is a flow chart of the LOAD ID subroutine for the RRT program of the present invention.
Figure 17:
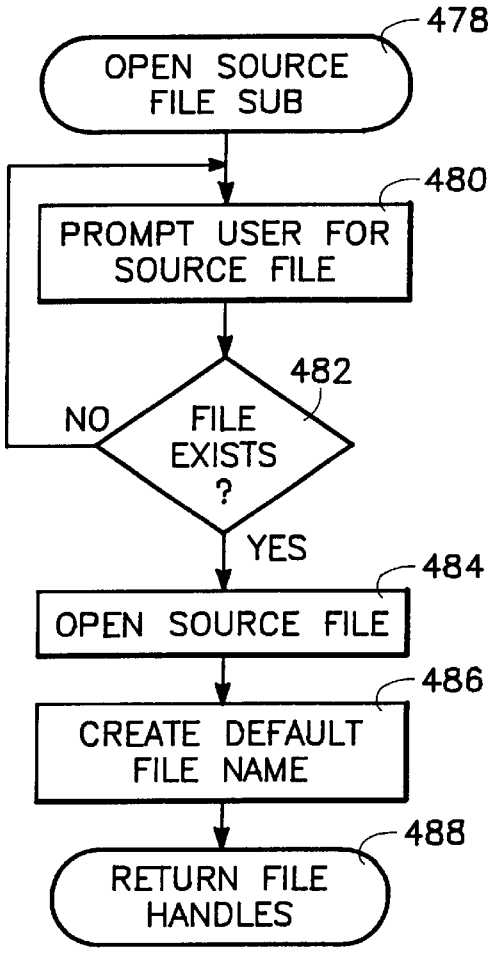
FIG. 17 is a flow chart of the OPEN SOURCE FILE subroutine for the RRT program of the present invention.
Figure 18:
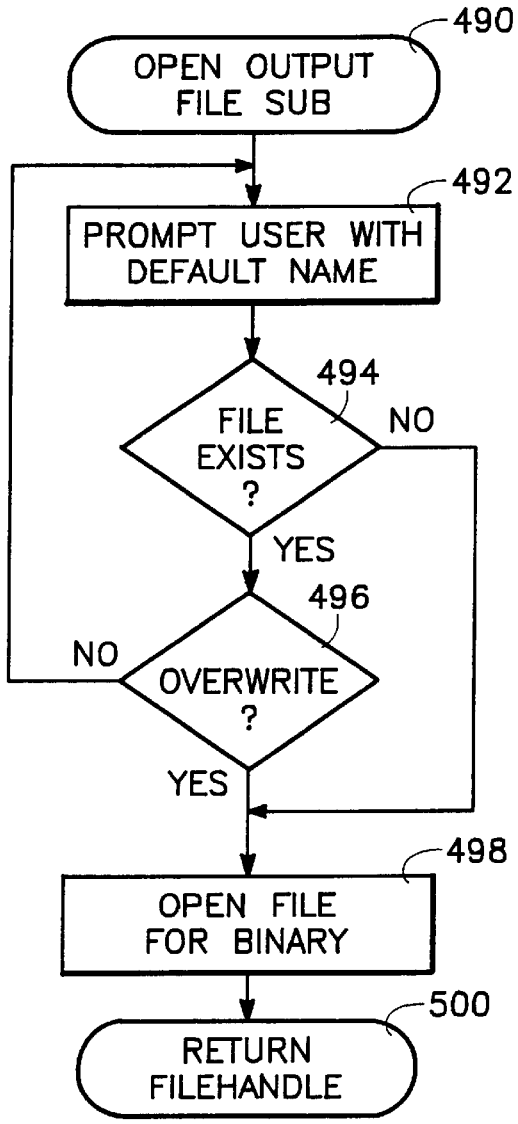
FIG. 18 is a flow chart of the OPEN OUTPUT FILE subroutine for the RRT program of the present invention.
Figure 20:
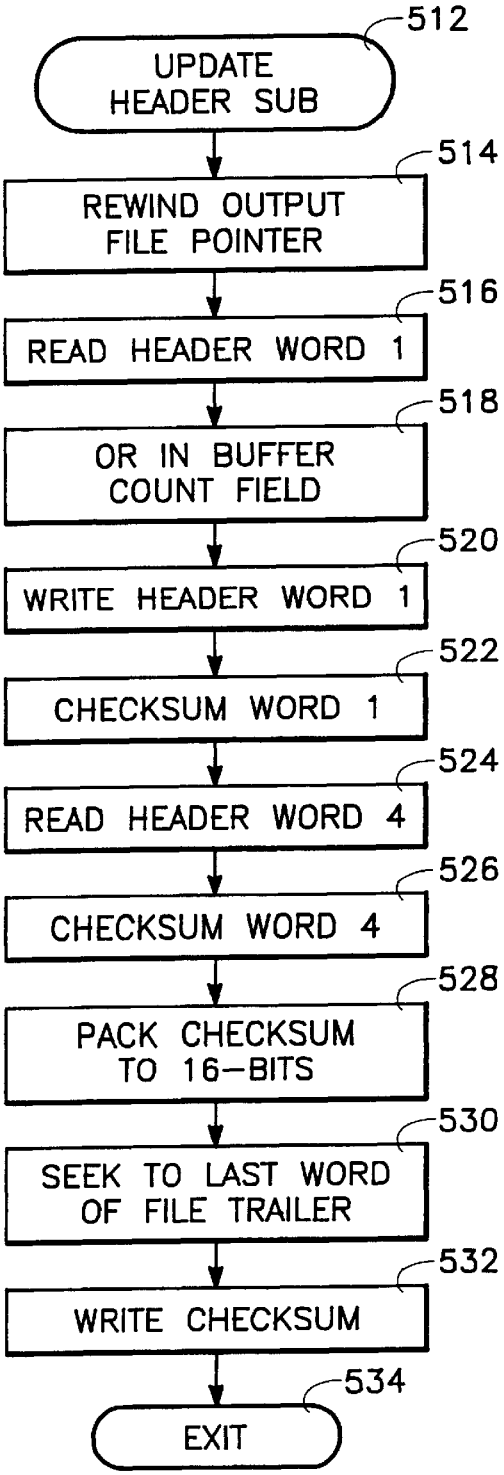
FIG. 20 is a flow chart of the UPDATE HEADER subroutine for the RRT program of the present invention.
Figure 19:
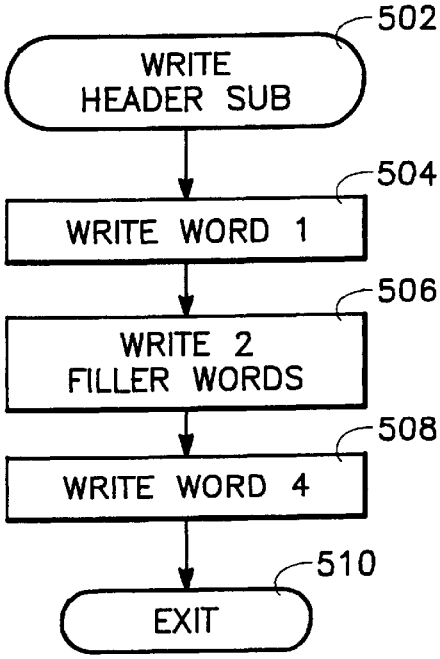
FIG. 19 is a flow chart of the WRITE HEADER subroutine for the RRT program of the present invention.
Figure 21:
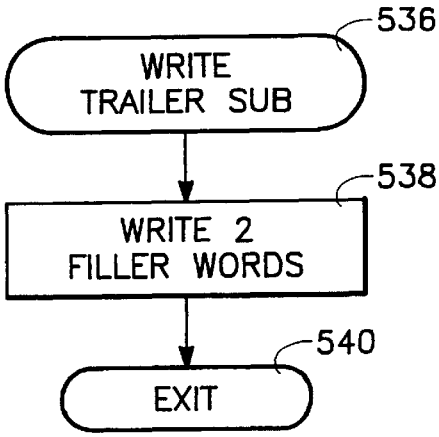
FIG. 21 is a flow chart of the WRITE TRAILER subroutine for the RRT program of the present invention.

Referring to FIG. 13, the Align64 subroutine pads a file with zero bytes to provide an even 64 word boundary. This subroutine is accessed from program step 270 of the Append Bit File subroutine of FIG. 8.

From the foregoing, it may readily be seen that the present invention comprises a new, unique and exceedingly useful utility software program adapted for use with an electronic countermeasures system which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A data conversion method for formatting Operational Flight Program and User Data File software files for an AN/ALQ-165 Deceptive Electronic Countermeasures set in a DOS compatible ASCII format comprising:

reading a limit file from an external source file, said limit file including command block data, said command block data being read from a designated area in said external source file which defines addresses and sizes of source file segments to program into an EEPROM non-volatile memory of a main computer of said AN/ALQ-165 Deceptive Electronic Countermeasures;

writing a listing header for a listing file having a source file name for identifying said external source file, an output binary memory loader verifier file name for a memory loader verifier file, and a command block file name for said command block data;

converting said command block data to an array of computer download records having a plurality of array indexes wherein each of said array indexes has a plurality of fields which define one computer download record of said array of computer download records;

generating a bit table which defines the size and checksums of said array of computer download records, said bit table having one entry in said bit table for each computer download record of said array of computer download records;

providing an end of file record having first, second and third hexadecimal characters after said bit table is generated; and writing each computer download record of said array of computer download records to said listing file and said output memory loader verifier file in said DOS compatible ASCII format.

2. A data conversion method for formatting Operational Flight Program and User Data File software files for an AN/ALQ-165 Deceptive Electronic Countermeasures set in a DOS compatible ASCII format comprising:

reading a limit file from an external source file, said limit file including command block data, said command block data being read from a designated area in said external source file which defines addresses and sizes of source file segments to program into an EEPROM non-volatile memory of a main computer of said AN/ALQ-165 Deceptive Electronic Countermeasures;

writing a listing header for a listing file having a source file name for identifying said external source file, an output binary memory loader verifier file name for a memory loader verifier file, and a command block file name for said command block data;

converting said command block data to an array of computer download records having a plurality of array indexes wherein each of said array indexes has a plurality of fields which define one computer download record of said array of computer download records;

calculating a record checksum for each of said computer download records of said array of computer download records, said data conversion method reporting a checksum error whenever said checksum calculated by said data conversion method does not match a predetermined checksum for each of said computer download records;

generating a bit table which defines the size and checksums of said array of computer download records, said bit table having one entry in said bit table for each of said computer download records of said array of computer download records;

providing an end of file record having first, second and third hexadecimal characters after said bit table is generated; and writing each computer download record of said array of computer download records to said listing file and said output memory loader verifier file in said DOS compatible ASCII format.

3. A data conversion program for formatting Operational Flight Program and User Data File software files for an AN/ALQ-165 Deceptive Electronic Countermeasures set in a DOS compatible ASCII format comprising:

means for reading a limit file from an external source file, said limit file including command block data, said command block data being read from a designated area in said external source file which defines addresses and sizes of source file segments to program into an EEPROM non-volatile memory of a main computer of said AN/ALQ-165 Deceptive Electronic Countermeasures;

means for writing a listing header for a listing file having a source file name for identifying said external source file, an output binary memory loader verifier file name for a memory loader verifier file, and a command block file name for said command block data;

converting means for converting said command block data to an array of computer download records having a plurality of array indexes wherein each of said array indexes has a plurality of fields which define one computer download record of said array of computer download records;

generating means for generating a bit table which defines the size and checksums of said array of computer download records, said bit table having one entry in said bit table for each computer download record of said array of computer download records;

means for providing an end of file record having first, second and third hexadecimal characters after said bit table is generated; and means for writing each computer download record of said array of computer download records to said listing file and said output memory loader verifier file in said DOS compatible ASCII format.

4. The data conversion program of claim 3 wherein the computer download records of said array of computer download records being converted by said data conversion method comprises between three and eight computer download records.

5. The data conversion program of claim 3 wherein said first, second and third hexadecimal characters of said end of file record respectively comprise hexadecimal characters 2F,5F,5F.

6. The data conversion program of claim 3 further comprising:

means for calculating a record checksum for each of said computer download records of said array of computer download records; and means for reporting a checksum error whenever said checksum calculated by said data conversion method does not match a predetermined checksum for each of said computer download records.

* * * * *